| United States Patent [19] | [11] | 4,261,109 |
|---|---|---|
| Mikus et al. | [45] | Apr. 14, 1981 |

[54] METHOD AND APPARATUS FOR CONTROLLING THE OPERATION OF A MAGNETICALLY STABILIZED FLUIDIZED BED BY MAGNETIC FIELD MEASUREMENT

[75] Inventors: Thomas Mikus, Watchung; Jeffrey H. Siegell, Westfield, both of N.J.

[73] Assignee: Exxon Research & Engineering Company, Florham Park, N.J.

[21] Appl. No.: 79,220

[22] Filed: Sep. 26, 1979

[51] Int. Cl.³ .............................................. F26B 3/08
[52] U.S. Cl. .................................... 34/1; 34/10; 34/57 A; 34/89; 324/251; 324/260
[58] Field of Search ............... 34/1, 57 A, 10, 89; 324/260, 251

[56] References Cited

U.S. PATENT DOCUMENTS

| 3,440,731 | 4/1969 | Tuthill | 34/1 |
|---|---|---|---|
| 3,597,679 | 8/1971 | Habfast | 324/251 |
| 4,099,238 | 7/1978 | Suzuki | 324/251 |
| 4,115,927 | 9/1978 | Rosensweig | 34/1 |

OTHER PUBLICATIONS

Investigation of the Homogeneity of a Fluidized Bed of Catalyst for Synthesis of Ammonia in an Electromagentic Field—Ivanov et al–Inter. Chem. Engrg., pp. 557-560, vol. 15, No. 3, Jul. 1975.

Primary Examiner—Larry I. Schwartz
Attorney, Agent, or Firm—Albert P. Halluin

[57] ABSTRACT

The present invention relates to a process and apparatus for monitoring the behavior of a magnetically stabilized fluidized bed. More particularly, the invention relates to monitoring the behavior and bed characteristics of a magnetically stabilized fluidized bed by measuring the magnetic field fluctuations in the bed. The bed may be operated in a batch or continuous solids addition and removal mode.

15 Claims, No Drawings

METHOD AND APPARATUS FOR CONTROLLING THE OPERATION OF A MAGNETICALLY STABILIZED FLUIDIZED BED BY MAGNETIC FIELD MEASUREMENT

FIELD OF THE INVENTION

The present invention relates to a process and apparatus for monitoring the behavior of a magnetically stabilized fluidized bed. More particularly, the invention relates to monitoring the behavior and bed characteristics of a magnetically stabilized fluidized bed by measuring the magnetic field fluctuations in the bed. The bed may be operated in a batch or continuous solids addition and removal mode.

DESCRIPTION OF THE PRIOR ART

Numbers of workers have studied the influence of magnetization on the dynamics of fluidized solids in batch beds. An early account of this phenomena was reported by M. V. Filippov [Applied Magnetohydrodynamics, *Trudy Instituta Akad. Nauk.*, Latviiskoi SSR 12: 215–236 (1960); *Zhurnal Tekhnicheskoi Fiziki*, 30 (9): 1081–1084 (1960); *Izvestiya Akad. Nauk.*, Latviiskoi SSR, 12 (173): 47–51 (1961); *Izvestiya Akad. Nauk.*, Latviiskoi SSR, 12: 52–54 (1961); and Aspects of Magnetohydrodynamics and Plasma Dynamics, Rigor (1962), *Izvestiya Akad. Nauk.*, Latviiskoi SSR, pp. 637–645]. Subsequent workers have reported on the influence that magnetization exerts on pulsations, heat transfer, structure, and other characteristics of magnetized and fluidized solids in batch beds. A review of some of this work is givn by Bologa and Syutkin [*Elecktron Obrab Mater*, 1: 37–42 (1977)]. Ivanov and coworkers have described some benefits of using an applied magnetic field on fluidized ferromagnetic solids in the ammonia synthesis process and some of the characteristics of the bed for this process [see British Pat. No. 1,148,513 and numerous publications by the same authors, e.g., Ivanov et al, *Kinet. Kavel*, 11 (5): 1214–1219 (1970); Ivanov et al, *Zhurnal Prikladnoi Khimii*, 43, 2200–2204 (1970); Ivanov et al, *Zhurnal Prikladnoi Khimmii*, 45: 248–252 (1972); Ivanov et al, *Chemical Industry*, 11: 856–858 (1974); Shumkov et al, *Zhurnal Prikladnoi Khimmi*, 49 (11) 2406–2409 (1976)]. Various means for operating magnetic fields to stabilize a bed of magnetizable solids have been disclosed in U.S. Pat. Nos. 3,440,731, 3,439,899, 4,115,927 and 4,143,469 and Belgium Patent No. 865,860 (published Oct. 11, 1978).

Recently, R. E. Rosensweig [*Science*, 204: 57–60 (1979), *Ind. Eng. Chem. Fundam.* 18 (3) 260–269 (1979) and U.S. Pat. Nos. 4,115,927 and 4,136,016] reported on a number of features of magnetically stabilized fluidized magnetizable solids and a systematic interpretation of the phenomena. In these publications and patents, R. E. Rosensweig reported on the quiescent yet fluid-like state of the magnetically stabilized (fluidized) bed (MSB), particularly one which is totally free of bubbles or pulsations when a uniform magnetic field is applied to a bed of magnetizable solids colinear with the direction of the fluidizing gas flow. As such, this magnetic stabilization produces a non-bubbling fluid state having a wide range of operating velocities denoted as a superficial fluid velocity ranging between (a) a lower limit given by the normal minimum fluidization-superficial fluid velocity required to fluidize the bed of solids in the absence of the applied magnetic field, and, (b) an upper limit given by the superficial fluid velocity required to cause time-varying fluctuations of pressure difference through the stabilized fluidized bed portion during continuous fluidization in the presence of the applied magnetic field. It is disclosed in Rosensweig's U.S. Pat. No. 4,115,927 that the stably fluidized solids resemble a liquid and as such enjoy the benefits that the solids are facilitated for transport while concomitantly the pressure drop is limited to that of a fluidized bed. In addition, the beds exhibit the absence of backmixing normally associated with fixed bed processes.

Ivanov and Shumkov [*International Chemical Engineering*, 15(3) 557–560, 1975] conducted studies on the relative bed fluctuations in the density of a bed of magnetized solids. They reported that there was a decrease in bed density fluctuations as one increases the applied magnetic field. Their studies are analogous to measuring pressure fluctuations in the bed.

The prior art such as Filippov, Rosensweig and others has generally ascertained the transition to the bubbling state denoted by Rosensweig as $U_T$ by either visual observation or by measuring the pressure difference through the bed of fluidized magnetized particles. These techniques are useful on a laboratory scale basis for determining the transition point in the bed behavior. However, for many large-scale industrial processes it is impossible to make visual observations of the bed. Also, it is desirable to automatically control the beds behavior with precision and measurements of the pressure fluctuations in the bed do not always give an early indication of bed behavior.

It has now been discovered that monitoring of the magnetic field fluctuations in a bed of fluidized magnetized solids is a very sensitive means for detecting the transition from the stable region to the bubbling state. Also, by monitoring the magnetic field fluctuations, one can, by proper instrumentation, automatically control the behavior of the magnetized fluidized bed, i.e., by controlling the applied magnetic field, the superficial fluid velocity rate, temperature of the bed, the pressure in the bed, the rate of addition of magnetic or non-magnetic particles, etc.

SUMMARY OF THE INVENTION

The present invention is directed to a process for monitoring the behavior of a magnetically stabilized fluidized bed by measuring the magnetic field fluctutions in the bed. The magnetic field fluctuation information can be used as an indicator of bed conditions, e.g., bubbling or stable.

The invention also pertains to a stabilized fluidized type contactor having magnetic field fluctuation monitoring capability, comprising:

(a) a vessel having fluid (gas or liquid) inlet means and fluid (gas or liquid) outlet means;

(b) a fluidizable bed made up of particulate solids, said solids having ferromagnetic properties;

(c) magnetic stabilizing means capable of forming a magnetic field in at least a portion of the fluidized bed; and (d) magnetic field fluctuation detecting means placed in said fluidizable bed.

In a preferred mode of the invention, the magnetic field fluctuation detecting means, e.g., a Hall-effect gaussmeter is connected to an amplifier. The magnetic field fluctuating detecting means may also be connected to control means for applying the magnetic field or controlling the quantity of fluid throughout which fluidizes the bed.

Another aspect of the invention relates to continuously controlling the operation of a magnetically stabilized fluidized bed by monitoring the magnetic field fluctuations in the bed and thereby adjusting the bed operating conditions, e.g., the applied magnetic field strength, superficial fluid velocity, temperature or pressure, in the bed, the rate of addition of magnetic or non-magnetic particles to the bed, etc. Such control methods can be used to operate the fluidized bed at or near transition point, i.e., from a bubbling to stabilized state or from stabilized to bubbling state. Since the magnetic field fluctuation detecting method of the present invention is very sensitive, one can detect the point of bed destabilization at an earlier point in time. The magnetic field fluctuation information or data can be processed electronically and through known circuitry the power source to the electromagnets which control the magnetic field strength can be regulated. By continuously monitoring the magnetic field fluctuations one can regulate the magnetic field strength and the desired bed characteristics can be maintained electronically.

The process of the invention is preferably carried out under conditions such that the applied magnetic field or superficial fluid (preferably gas) velocity is controlled such that the percent of $H_{rms}/H_{mean}$ ranges from zero to about 0.7, more preferably from zero to about 0.3, and even more preferably from zero to 0.1, wherein the $H_{rms}$ is the root mean square of the fluctuation signal of the measured magnetic field and $H_{mean}$ is the mean applied (or measured) magnetic field strength.

The process of the present invention is applicable to a variety of processes such as particulate removal of solids, catalytic conversions, sorption processes, gas separation processes, etc.

DESCRIPTION OF THE PREFERRED EMBODIMENTS

The instantaneous magnetic field inside a magnetically stabilized fluid bed, whether such field is produced by external electro- or permanent magnets, by permanently magnetic particles or by other means can be continually measured by well-known instruments such as a Hall-effect gaussmeter. From this measurement can be derived both the time-average magnitude and the frequencies and amplitudes of fluctuating components of the field. These quantities are related to the bed's state of fluidization and to the magnetic and fluid mechanic fluctuations which affect the bed's stability with respect to bubbling. Manual or automatic interpretation of these quantities can therefore be used firstly to monitor the behavior of the bed, and secondly as part of a control system to maintain some desired state such as marginal quiescence, incipient bubbling, or a given degree of bubbling.

The control can be exercised through the variation of magnetic parameters such as the applied field (for the case of external magnets) or magnetization of incoming solids (for the case of circulating permanently magnetized particles) or the variation of process parameters such as feed flow rate, pressure, temperature or concentrations, as the process requirements allow. Each of these control parameters has an economic value and this can be used to minimize operating costs.

In U.S. Pat. No. 4,115,927 there is described a process for operating in a stable region bounded by the minimum fluidization velocity and by the locus of points of transition to a bubbling fluidized bed. It has been recently found that the fluidity of beds operating in the stable region continuously decrease from the fluidity at the transition as the magnetic field is increased above, or the velocity decreased below, the value at transition. Thus, it is desirable to operate close to the transition point from the stable state to bubbling state when one wants to achieve maximum fluidity particularly in continuous solids addition and removal processes. By use of the magnetic field fluctuation detecting method of the present invention, one can control the operation of the magnetically stabilized bed so as to continually operate at any given condition, such as at or near the transition point between the bubbling and stable states of the magnetized fluidized bed.

In a preferred embodiment, the process of the invention is carried out by fluidizing magnetizable particles under countercurrent plug flow conditions by subjecting the magnetizable particles to a magnetic field, preferably a uniform applied magnetic field having a substantial component along the direction of the external force field (e.g., gravity) such that the magnetizable particles have a component of magnetization along the direction of the external force field and wherein at least a portion of the bed of particles is levitated (fully supported) by a flow of fluid opposing said external force field at a superficial fluid velocity and particle magnetization such that the fluidity ratio defined as:

$$\frac{U_T - U_{OP}}{U_t - U_{mf}}$$

ranges between −0.1 and +0.5, preferably between −0.05 and +0.2 and more preferably between −0.01 and +0.01, wherein $U_T$ is the superficial fluid velocity required to cause time-varying fluctuations of pressure difference through the bed in the presence of the applied magnetic field, $U_{mf}$ is the normal minimum fluidization superficial fluid velocity required to fluidize the bed of magnetizable particles in the absence of an applied magnetic field, and $U_{OP}$ is the actual operating superficial fluid velocity. The magnetization of the magnetizable particles will be in sufficient to cause substantial particle-to-particle agglomeration as this will decrease the overall fluidity of the bed particles. Preferably the strength of the magnetic field and its deviation from a vertical orientation are maintained so as to prevent and/or suppress the formation of bubbles in the fluidized media at a given fluid flow rate and with a selected fluidized particles makeup. The magnetically stabilized fluidized beds have the appearance of expanded fixed beds with no gross solids recirculation (except for the plug flow movement through the vessels) and very little or no gas bypassing. The application of the magnetic field enables one to employ superficial fluid flow rates 2, 5, 10 or 20 times or more times the flow rate of the fluidized bed at incipient fluidization in the absence of the applied magnetic field, concomitant with the substantial absence of gross solids circulation. In other words, as the superficial fluid velocity is increased, the pressure drop through the bed is similar to that which would be expected from a normal fluidized bed without the application of a magnetic field, it increases to the bed weight support value at the minimum fluidization velocity, and then remains relatively constant as the fluid velocity is increased. This stably fluidized bed condition persists even as the solids are continuously added and removed in a descending, plug flow manner through the contacting vessel.

The fluidity of the bed of magnetized particles in the stable region continuously decreases from the fluidity at the bubbling or transition fluidization velocity as the magnetic field is increased above, or the superficial fluid velocity is decreased below the value at transition. Thus, in the case of moving beds, it is desirable to operate close to the locus of points of transition from the stable non-bubbling bed and the bubbling region in order to take advantage of the increased fluidity. This can be monitored by the method of the present invention.

The fluidity of the bed can be determined by measuring the angle of repose of the bed particles at given superficial gas velocities and particle magnetization. Such experimental measurements have shown that by increasing the particle magnetization or decreasing the superficial gas velocity from the transition point increases the angle of repose. Thus, to operate the fluidized bed with increased bed fluidity, one should operate at low particle magnetization or high gas velocities (i.e., as close to transition as possible). In any event, the particle magnetization for the particular particles used should be insufficient to cause substantial stiffening of the bed, i.e., the point at which the bed medium develops appreciable resistance to flow.

The magnetically stabilized bed thus described can combine in one system the principal advantages of both fluid beds and fixed bed reactor systems. Listed in Table I are a number of desirable features and characteristics for a good contactor or reactor system. For example, with small particle size diffusional resistance within a bed particle can be reduced and the catalyst or sorbent used more effectively. Concomitantly, both high pressure drop and gross gas bypassing are eliminated. By practice of the process of the instant invention, all of these features can be achieved in a single system. Also with the magnetically stabilized bed several steps or operations can be combined in the single reacting system; for example, simultaneous reaction and gas to particle heat exchange, particulate removal plus chemical reaction, etc. In addition, since the stabilized beds are mobile and the bed solids are circulated, it is possible to carry out continuous reactions with frequent regenerations so that catalyst or sorbent activity can be restored on a very short cycle.

TABLE I

| MSB Combines Principal Advantages of Fluid Beds and Fixed Beds | | | |
|---|---|---|---|
| | Fluid Bed | MSB | Fixed Bed |
| Small particle size with low $\Delta p$ | yes | yes | no |
| Absence of gas bypassing | no | yes | yes |
| Continuous solids through-put | yes | yes | no |
| Countercurrent contacting | no | yes | no |
| Avoids entrainment from bed | no | yes | yes |

The magnetizable solids of the magnetically stabilized bed are preferably flowed downward countercurrent to the fluidizing fluid (preferably a gas or feed vapors) with the piston flow of the stabilized solids permitting close control of sorption and chemical reaction. These features are particularly advantageous for separations in countercurrent gas solids systems that normally require a high degree of staging.

The process of the invention is well suited for removing small contaminant particulates from a gas stream, especially at elevated temperatures and pressures which are beyond the capability of commercial electrostatic precipitators and baghouses. Since the bed is fluid, the contents may be removed for cleaning on a continuous basis, and due to the expanded state of the bed, the pressure drop remains nearly constant in operation even upon collecting several weight percent of fines.

A wide range of magnetizable particles may be employed as the capture medium in the process of the invention. Generally speaking, the capture efficiency increases as a function of higher particle magnetization. Bed depth, applied field and capture time are all important variables. Bed loadings of 3-6 wt. % have been achieved while maintaining 99+% overall efficiency with collected particulates in the range 1-16 microns.

The magnetizable particles used in the process of the present invention must have the proper magnetizable (and in some instances sorptive or catalytic) properties. Depending upon the application, a variety of magnetizable particles may be utilized. For noncatalytic operations such as filtering and heat transfer, ferromagnetic solids such as 400 series stainless steels, cobalt, iron and nickel as well as natural ferrites can be used. For catalytic or sorption applications the magnetizable particles must be included in suitable catalyst or sorption particle bases, such as silica, alumina or silica-aluminas.

For economy, it is desirable that the bed solis achieve sufficient magnetization to structure or stabilize the bed at a relatively small intensity of applied magnetic field in order that the electromagnet field source be economic. When ferromagnetic particles are placed in the magnetic field, the induced magnetization is a function of the magnetic material, the geometry of the ferromagnetic particle, and the geometry of the bed. The effective field $H_e$ within the magnetic substance can be related to the applied field $H_a$, the ferromagnetic particle magnetization $M_f$, and the demagnetization coefficient of the ferromagnetic particles $d_f$ and that of the bed $d_b$ by the relationship $H_e = H_a - d_b M_b + d_s M_b - d_f M_f$ where $M_b = (1 - \xi_o) M_f$. The value of $D_s$ is constant at $\frac{1}{3}$ so $H_e$ is increased by reducing $d_b$ and $d_f$. Geometry establishes the demagnetization coefficient for axially magnetized cylinders as $d = 1 - [L/D]/[1 + (L/D)^2]^{\frac{1}{2}}$. Thus, a low value of $d_b$ is favored by a bed in which length exceeds diameter.

With proper selection of magnetic particles, the requirement for the electromagnetic field source in commercial plants will be modest. Magnet power-dissipation creates heat that is removed using natural convection air cooling. This eliminates any need for liquid convection cooling and attendant requirements for coolant treatment and recirculation. The magnetic field source may be computer designed with high confidence to yield an applied magnetic field having a specified intensity and uniformity.

The invention is not limited by the shape or positioning of the magnet employed to produce the magnetic field. The magnet can be of any size, strength or shape and can be placed above or below the bed to achieve special effects. The magnets employed can be placed within or without the vessel and may even be employed as an integral portion of the vessel structure itself. The process is not limited to any particular vessel material and it can be readily adapted for use in contacting vessels currently employed by industry.

The amount of magnetic field to be applied to the fluidized solids in the contacting zones (adsorption and desorption zones) will, of course, depend on the desired magnetization for the magnetizable particles and the amount of stabilization desired. Particles having relatively weak magnetic properties, e.g., some composites and alloys, will require the application of a stronger magnetic field than particulate solids having strong ferromagnetic properties, e.g., iron, to achieve similar stabilization effects. The size and shape of the solids will also obviously have an effect on the strength of the magnetic field to be employed. However, since the strength of the field produced by an electromagnet can be adjusted by adjusting the current strength of the electromagnet, an operator can readily adjust the field strength employed to achieve the desired degree of stabilization for the particular system employed. Specific methods of applying the magnetic field are also described in U.S. Pat. Nos. 3,440,731; 3,439,899; 4,115,927 and 4,143,469; British Pat. No. 1,148,513 and in the published literature, e.g., M. V. Filippov, Applied Magnetohydrodynamics, *Trudy Instituta Fizika Akad. Nauk.*, Latviiskoi SSR 12: 215–236 (1960); Ivanov et al, *Kinet. Kavel,* 11 (5): 1214–1219 (1970); Ivanov et al, *Zhurnal Prikladnoi Khimii,* 45: 248–252 (1972); and R. E. Rosensweig, *Science,* 204: 57–60 (1979), which are incorporated herein by reference. The most preferred applied magnetic field will be a uniform magnetic field such as described in U.S. Pat. No. 4,115,927. Typically, the empty vessel applied magnetic field, as taught in U.S. Pat. No. 4,115,927, will range from about 50 to about 1500 oersteds, preferably from about 100 to about 600 oersteds and more preferably from about 125 to about 400 oersteds.

The applied magnetic field may be either time varying current (AC) or direct current (DC). The latter is preferred. A spatially uniform DC field having a superposed AC component behaves substantially as a DC field provided the DC field intensity is substantially greater than the amplitude of the AC field component.

The solid particulate magnetizable and fluidizable particles to be used in the practice of the present invention are preferably particles having a low or zero coercivity. All ferromagnetic and ferrimagnetic substances, including but not limited to magnetic $Fe_3O_4$, $\gamma$-iron oxide ($Fe_2O_3$), ferrites of the form $XO.Fe_2O_3$, wherein X is a metal or mixture of metals such as Zn, Mn, Cu, etc.,; ferromagnetic elements including iron, nickel, cobalt and gadolinium, alloys of ferromagnetic elements, etc. may be used as the magnetizable and fluidizable particulate solids. Other non-magnetic materials may be coated with and/or contain dispersed therein solids having the quality of ferromagnetism. For example, composites of magnetizable and fluidizable solid particulates, for example in some catalytic processes may contain from 2 to 40 volume percent and preferably 5 to 20 volume percent and more preferably 10–15 volume percent of the ferro- or ferrimagnetic material and the balance of the composite will be comprised of nonmagnetic material. Often it will be desirable to use a ferro- or ferrimagnetic composite with a nonmagnetic catalytic material. The fluidized bed containing the composites may also include particulate solids which are nonmagnetizable. In other processes it may be desirable to use 100% ferro- or ferrimagnetic materials as the particulate solids.

An important factor in selecting or preparing the magnetizable and fluidizable particulate solids in the magnetization M of the particle. The higher the magnetization M of the particle, the higher will be the transition velocity $U_T$ up to which the bed may be operated without bubbling and bed fluctuation, all other factors such as particle size and distribution being held constant. The magnetization of the magnetizable and fluidizable particles in the medium will have a magnetization M of at least 10 gauss. Generally for high fluid velocities, the particles will have a magnetization, as being imparted by the applied magnetic field, of at least 50 gauss, preferably at least 100 gauss and more preferably at least about 150 gauss, e.g., 150–400 gauss. For those processes requiring very high fluid velocities, the magnetization of the magnetizable, fluidizable particles may be up to about 1000 gauss or more, but preferably 150–450 gauss.

The magnetization M of the particles, as is well known, is defined as B-H in the particle, where B is the magnetic induction and H is the magnetic field, the fields being defined in standard published works in electromagnetism, e.g., *Electromagnetic Theory,* J. A. Stratton, McGraw-Hill (1941). The value of M may be measured in a variety of ways, all of which give the same value M since M has an objective reality.

One means for determining magnetization M of the particles in a bed under the influence of a given applied magnetic field is to measure their magnetic moment at that field in a vibrating sample magnetometer under conditions of similar voidage, sample geometry and temperatures as exist in the process to be used. The magnetometer gives a value of $\sigma$, the magnetic moment per gram from which magnetization M is obtained from the formula:

$$M = 4\pi\rho\sigma$$

where $\rho$ is the density of the particles in the test sample, $\sigma$ is the magnetic moment in emu/g and M is the magnetization of the particles in gauss at the applied magnetic field tested.

Thus, it can be seen from the above discussion that the fluid region of stable operation is potentially expanded with increasing magnetization of the particles. The actual magnetization of the particles in the fluidization vessel will be a function of the particles themselves (the degree of magnetizability they inherently possess) and the intensity of the applied magnetic field.

As stated above the magnetizable particles should have a certain degree of magnetization M which is imparted to the particles by the intensity of the applied magnetic field. Obviously one would seek the lowest applied magnetic field possible because of cost. Commonly many of the composite particles will require at least 50 oersteds, more often more than 100 and preferably less than 1000 oersteds to achieve the requisite magnetization M. The determination of the applied magnetic field will take into account the type of particles fluidized, i.e., their magnetization, particle size and distribution, the fluid velocity to be used, etc.

As stated earlier the magnetizable and fluidizable particles may be admixed with nonmagnetic materials. For example, silica, alumina, metals, catalysts, coal, etc. may be admixed with the magnetizable and fluidizable particles and the advantages of the present invention still obtained. In the case of admixtures (as opposed to composite materials containing the magnetizable particles) it is preferred that the volume fraction of magnetizable particles exceed 25 percent, more preferably exceed 50 volume percent. Often the bed will be comprised of 100 volume percent of the magnetizable and fluidizable particles (i.e., it will not contain admixtures of other materials). When the nonmagnetizable admixture exceeds 75 volume percent, the particle mixtures may separate analogous to liquids of limited solubility.

The present invention is also applicable to the fluidization of permanently magnetic particle beds, such as disclosed in U.S. Pat. No. 4,132,005, the disclosure of which is incorporated herein by reference.

The average mean diameter of the fluidizable and magnetizable or permanent magnetic particles will range from about 100 microns to 2000 microns, more preferably from 150 to 1000 microns. Often the average mean diameter will range from about 150 to 500 microns, preferably from 200 to 400 microns and more preferably from 200 to 350 microns. The particle size range referred to herein is that determined by the mesh openings of a first sieve through which the particles pass and a second sieve on which the particles pass and a second sieve on which the particles are retained.

The superficial fluid velocity to be used in practicing the invention will be more than the normal minimum fluidization superficial fluid velocity of the bed containing the solid particulate magnetizable and fluidizable material in the absence of the applied magnetic field. Preferably the superficial fluid velocity will be at least 10% above the normal minimum fluidization superficial fluid velocity of the bed containing the solid particulate magnetizable and fluidizable material in the absence of the applied magnetic field. In some instances it will be desirable to operate the process at more than 2, 5, 10, 15 and 20 or more, and quite often 2 to 10 times the normal minimum fluidization superficial fluid velocity required to fluidize the bed containing the solid particulate magnetizable, fluidizable materials in the absence of the applied magnetic field.

The following example will serve to more fully describe the manner of making and using the above-described invention, as well as to set forth the best modes contemplated for carrying out various aspects of the invention. It is understood that this example in no way serves to limit the time scope of this invention, but rather is presented for illustrative purposes.

EXAMPLE

The purpose of this example is to illustrate by measurement of the magnetic field fluctuations in stably (nonbubbling) magnetized fluidized bed and the increase of field fluctuations when the bed bubbles.

One hundred and sixty six grams of $-20/+30$ U.S. sieve G-87RS catalyst were placed in a 5 centimeter I.D. glass vessel fitted with a porous disk distributor. A magnetic field of 569 oersted intensity was applied to the bed. Nitrogen at ambient temperature and pressure was passed upward at a superficial velocity of 51.4 cm/s yielding an expanded bed height of about 15 centimeters. Minimum fluidization velocity previously was found to be 23.5 cm/s as determined from the breakpoint in a curve of measured values of bed pressure drop vs. fluid flow rate.

A Hall effect gaussmeter probe (Bell Z OB4-3218) was mounted above the vessel with its active element in the middle of the bed of solids. The probe is a flat ended cylinder of 0.81 cm O.D. sensing the magnetic field component normal to the flat end, i.e. the axial component of field in the vessel. The probe was connected to a Bell 620 gaussmeter, whose output was amplified by a Tektronix AF 501. A custom low-pass filter having amplitude response down 50% at 70 Hz to eliminate a 5 KHz gaussmeter oscillator signal then fed a Disa 55 D 35 RMS unit operated with a 100 second averaging time, whose output was recorded on a Hewlett-Packard 7004B X-Y recorder.

The following table presents the mean axial magnetic field applied to the bed, the fluctuating portion of that field expressed as a fraction of the mean, and the visually observed state of the bed. A measure of the noise in these measurements is given by the "no flow" column at several field strengths. It can be seen that the fluctuations in the quiescent state are predominantly noise. The fluctuation level rises very sharply as the field is decreased through the bubbling point, and more gradually thereafter.

TABLE II

| $H_{mean}$, oe | $H_{rms}/H_{mean}$ | No flow $H_{rms}/H_{mean}$ | State of Bed |
|---|---|---|---|
| 569 | $1.6 \times 10^{-4}$ | | quiescent |
| 461 | $1.7 \times 10^{-4}$ | | quiescent |
| 442 | $1.6 \times 10^{-4}$ | $>1.6 \times 10^{-4}$ | quiescent |
| 400 | $1.6 \times 10^{-4}$ | | quiescent |
| 360 | $1.9 \times 10^{-4}$ | | quiescent |
| 355 | | $1.6 \times 10^{-4}$ | |
| 350 | $2.7 \times 10^{-4}$ | | quiescent |
| 309 | $6.6 \times 10^{-3}$ | | light bubbling |
| 242 | $1.0 \times 10^{-2}$ | | moderate bubbling |
| 119 | $1.8 \times 10^{-2}$ | | heavy bubbling |
| 62 | | $4.1 \times 10^{-4}$ | |
| 60 | $2.2 \times 10^{-2}$ | | heavy bubbling |
| 12 | $5.2 \times 10^{-2}$ | | heavy bubbling |
| 12 | | $2.1 \times 10^{-3}$ | |
| | $H_{rms}$, oe | $H_{rms}$, oe | |
| 0 | 0.210 | | heavy bubbling |
| 0 | | 0.022 | |
| in "zero gauss chamber" | | 0.022 | |

It will be understood that the instant monitoring method and apparatus is useful in all modes of magnetic/fluid/solids operation. As described above, it can be used to monitor and control a stable bed close to the transition point, i.e., the most fluid region of operation. It can also be used as an indicator of transition from bubbling to stable or from stable to bubbling beds.

The monitoring method of the invention is also of use in cases where the nominal operating point is far from transition in terms of velocity and magnetization. It is not intended to limit, but for example, in a process where there may be a sudden increase in temperature, the magnetic solids may be brought close enough to their Curie temperature that a higher magnetic field is required to prevent bubbling. Operation of the apparatus and process of the present invention allows this to be done automatically. This capability also applies to cases where a magnetic bed is intentionally being operated in the bubbling region, for whatever reason. A sudden change, such as a decrease in the feed rate of a nonmagnetic admixed component, could be counteracted by automatically decreasing the magnetic field to maintain the bed in the desired condition.

As earlier indicated it is possible to derive both the time average magnitude and the frequencies and amplitudes of the fluctuating components of the field from the magnetic field fluctuation measurements. An example of how the amplitudes of the fluctuating components of the field can be utilized is as follows:

(a) perform a "spectral analysis" of the fluctuating magnetic field signal.

(b) use the amplitude of any or all frequency components of the fluctuating magnetic field as a more sensitive indicator of the bed status, again for monitor and control of the bed.

What is claimed is:

1. In a process for operating and adjusting one or more process parameters in a magnetically stabilized fluidized bed process wherein a bed comprising magnetizable solid particles are subjected to an applied magnetic field having a substantial component along the direction of the external force field such that the magnetizable solid particles have a component of magnetization along the direction of the external force field, and said bed of magnetizable solid particles is fluidized by a flow of fluid opposing said external force field, the improvement which comprises controlling the beds behavior by monitoring the magnetic field fluctuations in said bed and thereby adjusting one or more of said process parameters in response to said monitoring.

2. The process of claim 1 wherein the process parameters are controlled such that the $H_{rms}/H_{mean}$, ranges from zero to about 0.3% wherein $H_{rms}$ is the root mean square of the fluctuation signal of the measured magnetic field and $H_{mean}$ is the mean applied (or measured) magnetic field.

3. The process of claim 1 wherein the process parameters are selected from the group consisting of the applied magnetic field, temperature of the particles, the pressure in the bed, the velocity of the fluid and the addition of non-magnetizable particles in said bed.

4. In a process for operating and adjusting one or more process parameters in a fluidized bed process in the absence of an externally applied magnetic field which comprises passing fluidizing gas upwardly through a bed, comprising fluidizable permanently magnetized particles at a velocity greater than the minimum fluidizing gas velocity required to fluidize the bed of said particles which are not magnetized, said permanently magnetized particles having a coercivity of at least 50 oersteds, the improvement which comprises controlling the behavior in said bed by monitoring the magnetic field fluctuations in said bed to thereby adjust one or more of said process parameters of said bed in response to said monitoring.

5. The process of claim 4 wherein the process the process parameters are controlled such that the $H_{rms}/H_{mean}$, ranges from zero to about 0.3%, wherein $H_{rms}$ is the root mean square of the fluctuation signal of the measured magnetic field and $H_{mean}$ is the mean applied (or measured) magnetic field.

6. The process of claim 12 wherein the process parameters are selected from the group consisting of the temperature of the permanent magnetic particles, the pressure in the bed, the velocity of the fluid and the addition of non-magnetic particles in said bed.

7. A fluidized bed contactor comprising:

(a) a vessel means capable of retaining a plurality of fluidizable, magnetizable particulate solids, said vessel means including inlet and outlet means for introducing and removing fluid to and from said vessel;

(b) bed means located within said vessel means, said bed means comprising a plurality of fluidizable, magnetizable particulate solids;

(c) magnetic stabilizing means for establishing an applied magnetic field in at least a portion of said bed means of paragraph (b), said magnetic field having a substantial component along the direction of the external force field within said vessel means;

(d) detection means for detecting magnetic field fluctuations within said bed means of paragraph (b); and (e) control means interfaced with said detecting means for controlling one or more process parameters for operating said bed means, said control means being responsive to said detecting means.

8. The contactor of claim 7 wherein said control means controls the strength of the applied magnetic field or the quantity of fluid passing through the fluid inlet and outlet means in response to said detecting means.

9. The contactor of claim 7 wherein said detection means is a Hall-effect gaussmeter.

10. The contactor of claim 7 wherein said magnetic stabilizing means is a solenoidally shaped electromagnet co-axially positioned around said vessel means of paragraph (a).

11. The contactor of claim 10 wherein said magnetic stabilizing means is energized by direct current.

12. The contactor of claim 7 wherein said vessel means includes means for continuously introducing and withdrawing said particulate solids.

13. A fluidized bed contactor comprising:

(a) vessel means capable of retaining a plurality of fluidizable, magnetizable particulate solids, said vessel means including inlet and outlet means for introducing and removing fluid to and from said vessel;

(b) bed means located within said vessel means, said bed means comprising a plurality of fluidizable, permanently magnetized particulate solids having a coercivity of at least 10 oersteds;

(c) detection means for detecting magnetic field fluctuations within said bed means of paragraph (b); and (d) control means interfaced with said detecting means for controlling one or more process parameters for operating said bed means, said control means being responsive to said detecting means.

14. The contactor of claim 13 wherein the particulate solids have a coercivity of at least 50 oersteds.

15. The contactor of claim 13 wherein the particulate solids have a coercivity of at least 100 oersteds.

UNITED STATES PATENT OFFICE
CERTIFICATE OF CORRECTION

Patent No. 4,261,109          Dated April 14, 1981

Inventor(s) Thomas Mikus, Jeffrey H. Siegell

It is certified that error appears in the above-identified patent and that said Letters Patent are hereby corrected as shown below:

In col. 4, line 35, change "+0.01" to --+0.1--.

In col. 6, line 43, change "$D_s$" to --$d_s$--.

Signed and Sealed this

Twenty-fifth Day of October 1983

[SEAL]

Attest:

GERALD J. MOSSINGHOFF

Attesting Officer    Commissioner of Patents and Trademarks